US008582046B2

(12) United States Patent
Lee

(10) Patent No.: US 8,582,046 B2
(45) Date of Patent: Nov. 12, 2013

(54) LIQUID CRYSTAL DISPLAY AND METHOD THEREOF

(75) Inventor: Jeoung-Gwen Lee, Suwon-si (KR)

(73) Assignee: Samsung Display Co., Ltd. (KR)

( * ) Notice: Subject to any disclaimer, the term of this patent is extended or adjusted under 35 U.S.C. 154(b) by 281 days.

(21) Appl. No.: 12/483,286

(22) Filed: Jun. 12, 2009

(65) Prior Publication Data

US 2010/0007816 A1    Jan. 14, 2010

(30) Foreign Application Priority Data

Jul. 14, 2008    (KR) .................... 10-2008-0068196

(51) Int. Cl.
*G02F 1/1333*    (2006.01)

(52) U.S. Cl.
USPC ............................................. 349/58; 349/56

(58) Field of Classification Search
USPC ..................................................... 349/56, 58
See application file for complete search history.

(56) References Cited

U.S. PATENT DOCUMENTS

| | | | |
|---|---|---|---|
| 6,219,116 B1 * | 4/2001 | Yuuki et al. ........................ | 349/58 |
| 6,295,105 B1 * | 9/2001 | Lee et al. .......................... | 349/65 |
| 6,533,428 B1 * | 3/2003 | Ogo et al. ......................... | 362/631 |
| 6,854,856 B2 * | 2/2005 | Shin et al. ......................... | 362/613 |
| 7,086,774 B2 * | 8/2006 | Katsuda et al. ................... | 362/634 |
| 7,277,139 B2 * | 10/2007 | Chung et al. ...................... | 349/58 |
| 7,697,084 B2 * | 4/2010 | Kim ................................ | 349/58 |
| 2003/0223215 A1 * | 12/2003 | Shin et al. ......................... | 362/27 |
| 2004/0246401 A1 * | 12/2004 | Lee et al. .......................... | 349/58 |
| 2005/0068470 A1 | 3/2005 | Won | |
| 2005/0099790 A1 * | 5/2005 | Kang et al. ........................ | 362/31 |
| 2005/0140850 A1 * | 6/2005 | Su et al. ........................... | 349/65 |
| 2005/0146650 A1 * | 7/2005 | Chung et al. ...................... | 349/58 |
| 2006/0038933 A1 * | 2/2006 | Hashimoto ........................ | 349/58 |
| 2006/0098134 A1 * | 5/2006 | Park et al. ......................... | 349/58 |
| 2006/0170839 A1 * | 8/2006 | Yamamoto et al. ............... | 349/58 |
| 2006/0171170 A1 * | 8/2006 | Lee .................................. | 362/632 |
| 2006/0285030 A1 * | 12/2006 | Kim ................................ | 349/58 |
| 2008/0088764 A1 * | 4/2008 | Son et al. .......................... | 349/58 |
| 2008/0094535 A1 | 4/2008 | Suh et al. | |
| 2008/0180600 A1 * | 7/2008 | Oh .................................. | 349/65 |

FOREIGN PATENT DOCUMENTS

| | | |
|---|---|---|
| EP | 1879065 A1 | 1/2008 |
| JP | 2002-091330 A | 3/2002 |
| KR | 1020050031631 A | 4/2005 |
| KR | 1020070000690 A | 1/2007 |
| KR | 1020070005052 A | 1/2007 |
| KR | 10-0710168 * | 4/2007 |

OTHER PUBLICATIONS

EP Search Report issued by the EPO on May 6, 2010, during the examination of the corresponding European Patent Application. (No. 09008719.8).

* cited by examiner

*Primary Examiner* — K. Cyrus Kianni
(74) *Attorney, Agent, or Firm* — Cantor Colburn LLP

(57) ABSTRACT

A liquid crystal display includes a light guide plate guiding light, light sources disposed adjacent to at least one side of the light guide plate, and a lower receptacle. The lower receptacle includes a bottom plate on which the light guide plate and the light sources are disposed, a lower receptacle side wall extending in a direction substantially perpendicular to the bottom plate and from an edge of the bottom plate, and an upper plate extended from the lower receptacle side wall and substantially parallel to the bottom plate. The upper plate does not overlap the light guide plate in a plan view of the liquid crystal display.

10 Claims, 12 Drawing Sheets

LIQUID CRYSTAL DISPLAY AND METHOD THEREOF

This application claims priority to Korean Patent Application No. 10-2008-0068196, filed on Jul. 14, 2008, and all the benefits accruing therefrom under 35 U.S.C. §119, the contents of which are incorporated herein in its entirety by reference.

BACKGROUND OF THE INVENTION

1. Field of the Invention

The present invention relates to a liquid crystal display, and more particularly to a liquid crystal display that can reduce a manufacturing cost and an inflow of foreign substances.

2. Description of the Related Art

A liquid crystal display ("LCD"), which is one of the most widely used types of flat panel displays ("FPDs"), includes two substrates, on which electrodes are formed, and a liquid crystal layer interposed between the two substrates. In such a liquid crystal display, liquid crystal molecules of the liquid crystal layer are aligned or disposed in accordance with voltages being applied to the electrodes, and thus the quantity of light passing through the liquid crystal layer is adjusted.

A liquid crystal display, which is a passive self-luminous device, includes a liquid crystal panel displaying images and a backlight assembly supplying light to the liquid crystal panel. The backlight assembly is classified into a direct type and an edge type.

BRIEF SUMMARY OF THE INVENTION

Since a liquid crystal display ("LCD") is a passive self-luminous device, and requires a light source such as a backlight assembly, there are technical difficulties and increased costs associated with the LCD. For example, in the case of an edge type backlight assembly, expensive components such as lamp covers and so on, are required to reduce a loss of light emitted from the light source.

Research has been made on a structure that takes the place of expensive components such as lamp covers, through changing of the structure of other components of the backlight assembly, for example, a lower receptacle and so on. However, as the structure of the lower receptacle and so on is changed, it may be difficult to manufacture or assemble other components, or foreign substances may flow into the liquid crystal display due to gaps between the components.

An exemplary embodiment of the present invention provides a liquid crystal display reducing a manufacturing cost and an inflow of foreign substances thereto.

An exemplary embodiment provides a liquid crystal display including a light guide plate guiding light, light sources disposed adjacent to at least one side of the light guide plate; and a lower receptacle. The lower receptacle includes a bottom plate on which the light guide plate and the light sources are disposed, a lower receptacle side wall extending in a direction substantially perpendicular to the bottom plate and from an edge of the bottom plate, and an upper plate extended from the side wall and substantially parallel to the bottom plate. The upper plate does not overlap the light guide plate, in a plan view of the liquid crystal display.

An exemplary embodiment provides a liquid crystal display including a light guide plate guiding light, a light source disposed on each of opposing sides of the light guide plate, a lower receptacle, a reflection sheet, flat-plate optical sheets and an intermediate receptacle. The lower receptacle includes a bottom plate on which the light guide plate and the light sources are disposed, a lower receptacle side wall extending in a direction substantially perpendicular to the bottom plate and from an edge of the bottom plate, and an upper plate extended from the side walls and substantially parallel to the bottom plate. Each of the light sources is surrounded by a portion of the bottom plate, the lower receptacle side wall and the upper plate, the upper plate not overlapping the light guide plate, in a plan view of the liquid crystal display. The reflection sheet is disposed overlapping the bottom plate, the side walls of the lower receptacle, and the upper plates of the lower receptacle. The flat-plate optical sheets are disposed not overlapping with the upper plates of the lower receptacle. The intermediate receptacle contacts both the light guide plate and the optical sheets, and is engaged with the lower receptacle.

An exemplary embodiment provides a method of forming a liquid crystal display, the method including disposing a first light source adjacent to a first incident side of a light guide plate, and a second light source adjacent to a second incident side of the light guide plate, and disposing a reflection member between a first receiving container and the first light source, and between the first receiving container and the second light source. The receiving container includes a planar shaped container bottom plate, container upper plates disposed substantially parallel to the container bottom plate, and container side walls connecting the container bottom plate with the container upper plates and disposed substantially perpendicular to the container bottom plate. The reflection member includes a planar shaped reflection bottom plate, reflection upper plates disposed substantially parallel to the reflection bottom plate, and reflection side walls connecting the reflection bottom plate with the reflection upper plates and disposed substantially perpendicular to the reflection bottom plate. The container upper plates and the reflection upper plates are disposed adjacent to each other, and the container upper plates and the reflection upper plates do not overlap the light guide plate in a plan view of the liquid crystal display.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE INVENTION

Figure 1:
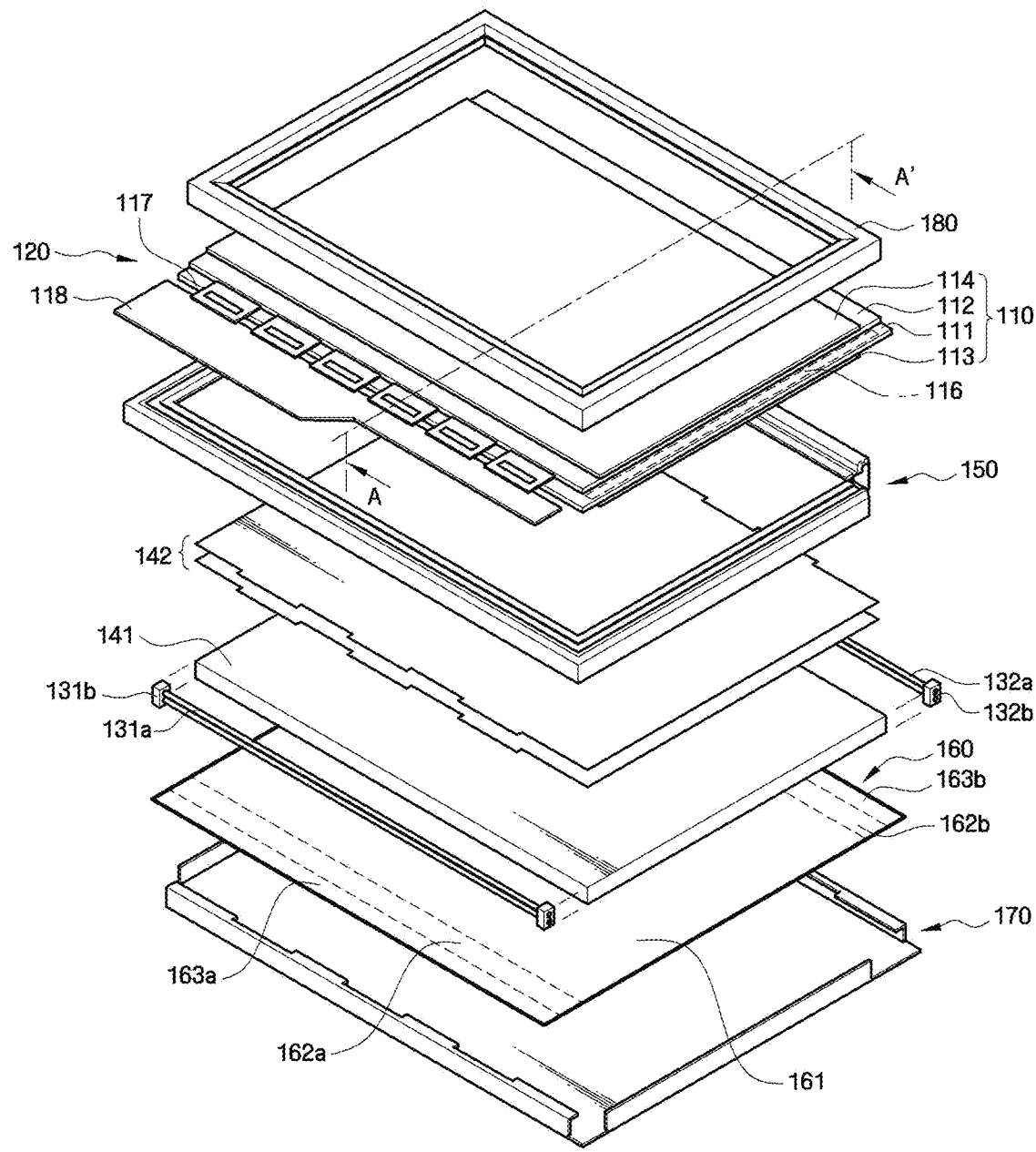
FIG. 1 is an exploded perspective view of an exemplary embodiment a liquid crystal display according to the present invention.

Hereinafter, exemplary embodiments of the present invention will be described in detail with reference to the accompanying drawings. The aspects and features of the present invention and methods for achieving the aspects and features will be apparent by referring to the embodiments to be described in detail with reference to the accompanying drawings. However, the present invention is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the invention, and the present invention is only defined within the scope of the appended claims. In the entire description of the present invention, the same drawing reference numerals are used for the same elements across various figures. In the drawings, the size and relative sizes of layers and regions may be exaggerated for clarity.

It will be understood that when an element or layer is referred to as being "on", "connected to" or "coupled to" another element or layer, the element or layer can be directly on, connected or coupled to another element or layer or intervening elements or layers. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative wordings "lower", "upper", and so forth, as illustrated in the drawings, may be used to facilitate the description of relationships between an element or constituent elements and another element or other constituent elements. The spatially relative wordings should be understood as wordings that include different directions of the element in use or operation in addition to the direction illustrated in the drawings. For example, if an element illustrated in the drawing is stated reversely, the element described to be "lower" relative to another element may be put "upper" relative to the another element. Accordingly, the exemplary wording "lower" may include both directions corresponding to "lower" and "upper". An element may be aligned in a different direction, and thus the spatially relative wordings may be interpreted according to the alignment of the element.

In the following description of the present invention, the terms used are for explaining embodiments of the present invention, but do not limit the scope of the present invention. In the description, a singular expression may include a plural expression unless specially described. As used herein, the singular forms "a", "an" and "the" are intended to include the plural forms as well, unless the context clearly indicates otherwise. The term "comprises" and/or "comprising" used in the description means that one or more other components, steps, operation and/or existence or addition of elements are not excluded in addition to the described components, steps, operation and/or elements.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless specially defined, all terms (including technical and scientific terms) used in the description could be used as meanings commonly understood by those ordinary skilled in the art to which the present invention belongs. In addition, terms that are generally used but are not defined in the dictionary are not interpreted ideally or excessively unless they have been clearly and specially defined.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the present invention will be described in detail with reference to the accompanying drawings.

Figure 2:
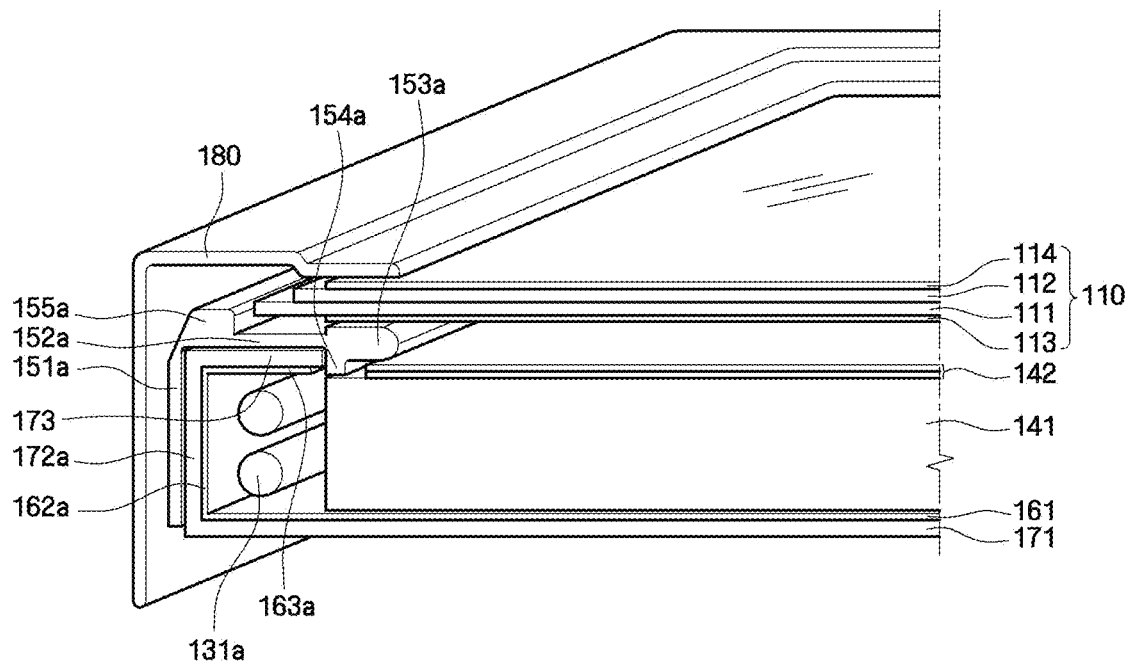
FIG. 2 is a cross-sectional view of the liquid crystal display, taken along line A-A' of FIG. 1.
Figure 2:
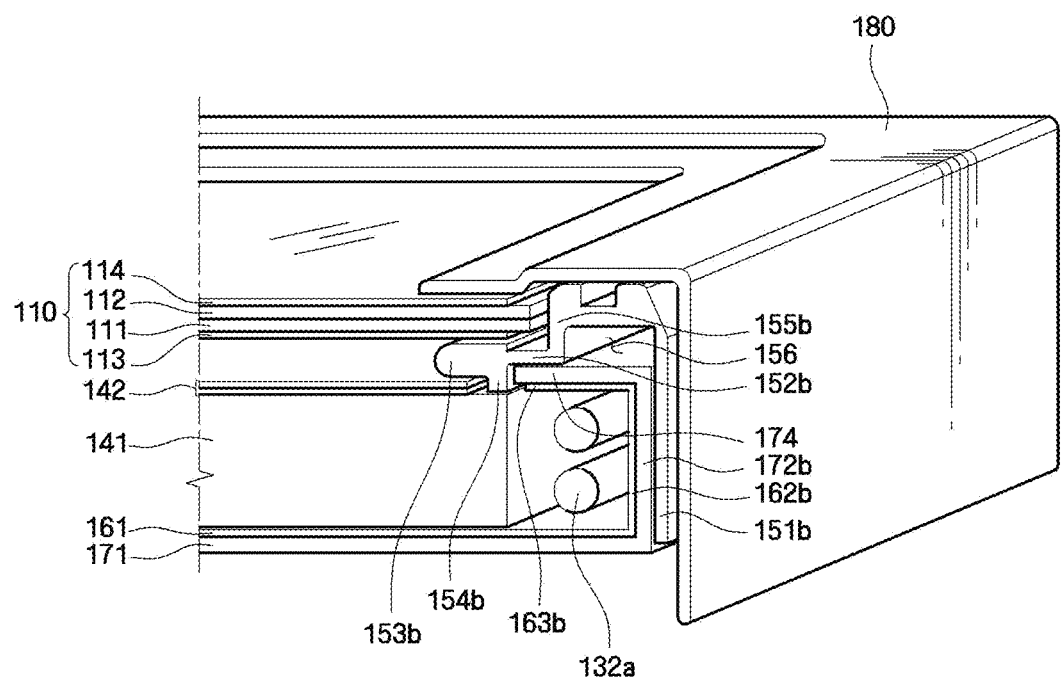

With reference to FIGS. 1, 2, an exemplary embodiment of a liquid crystal display according to the present invention will be described in detail. FIG. 1 is an exploded perspective view of an exemplary embodiment of a liquid crystal display according to the present invention, and FIG. 2 are collectively a cross-sectional view of the liquid crystal display, taken along line A-A' of FIG. 1. The wording "horizontal direction" used in the following description means a direction parallel to the long side of the liquid crystal display, and "vertical direction" means a direction parallel to the short side of the liquid crystal display. The wording "upper" means toward a viewing side of the liquid crystal display, and "lower" means toward a side opposing the viewing side relative to components of the liquid crystal display.

Referring to FIGS. 1, 2, the liquid crystal display includes a liquid crystal panel assembly 120 and a backlight assembly.

The liquid crystal panel assembly 120 includes a liquid crystal panel 10 including a first substrate 111, a second substrate 112, a first polarization plate 113 and a second polarization plate 114 each disposed on surfaces of the first and second substrates 111 and 112, liquid crystals (not illustrated) disposed between the first and second substrates 111 and 112, a gate drive IC 116, a data tape carrier package 117, and a printed circuit board 118. Each of the first substrate 111, the second substrate 112, the first polarization plate 113 and the second polarization plate 114 may be substantially flat and planar, such as a plate-like member.

The first substrate 111 may include gate lines (not illustrated), data lines (not illustrated), pixel electrodes, and the like, disposed thereon. The second substrate 112 may include black matrices, color filters, common electrodes, and the like, and be disposed facing the first substrate 111. The first polarization plate 113 may be disposed on a lower part (e.g., a lower surface) of the first substrate 111, and the second polarization plate 114 may be disposed on an upper part (e.g., an upper surface) of the second substrate 112. The color filters and/or the common electrodes may be disposed on the first substrate 111 in accordance with the type of the liquid crystal panel 110.

The liquid crystal panel 110, which includes the above-described flat plate type laminated substrates, is disposed in a receiving portion of an intermediate receptacle 150. The intermediate receptacle 150 may be substantially frame-shaped, with an open area disposed through a central portion of the frame, such as shown in FIG. 1.

The gate drive IC 116 may be integrated with and disposed on the first substrate 111. As used herein, "integrated" and "integral" may be used to define features of the invention disposed as a single, unitary, continuous and indivisible unit. The gate drive IC 116 is electrically connected to the respective gate lines (not illustrated). The data tape carrier package 117 is electrically connected to the respective data lines (not illustrated) disposed on the first substrate 111.

On a printed circuit board 118, various drive components for inputting a gate drive signal to the gate drive IC 116, and for inputting a data drive signal to the data tape carrier package 117 may be packaged, or disposed.

Referring again to FIGS. 1 and 2, the backlight assembly includes first and second light sources 131a and 132a, a light guide plate 141, a plurality of optical sheets 142, one or more of a reflection sheet 160, a lower receptacle 170, and the intermediate receptacle 150.

In the illustrated embodiment of the present invention, the first and second light sources 131a and 132a, which may be edge type light sources, are disposed at edges of at least one side of the liquid crystal display and are extended substantially in a horizontal direction. The first and second light sources 131a and 132a may be line light sources, such as a cold cathode fluorescent lamp ("CCFL"), an external electrode fluorescent lamp ("EEFL"), and the like, and may be disposed substantially parallel to the horizontal direction of the liquid crystal display.

The first and second light sources 131a and 132a are disposed directly adjacent to both of opposing sides of the light guide plate 141, to provide light to the light guide plate 141. The first and second light sources 131a and 132b may each include more than one light source tube, which are disposed adjacent to a respective light incident face (e.g., surface) of the light guide plate 141. As illustrated in FIGS. 1 and 2, the light guide plate 141 includes more than one light incident face.

Each of the first and second light sources 131a and 132a includes a first end and a second end which are opposing each other in the horizontal direction of the liquid crystal display relative to the light source tubes. Both ends of each of the first and second light sources 131a and 132a are fixed to first and second light source holders 131b and 132b, respectively. In an exemplary embodiment, the first and second light sources 131a and 132a are electrically connected to an inverter (not illustrated) supplying a power to the first and second light sources 131a and 132a.

The light guide plate 141 is received in the lower receptacle 170 so that the first and second light sources 131a and 132a are disposed on the both opposing sides of the light guide plate 141. Details of positional relations and shapes of the light guide plate 141, the lower receptacle 170, and the optical sheets 142 will be described later.

In order to efficiently guide light, the light guide plate 141 may be made of a light transmitting material, for example, acrylic resin, such as polymethylmethacrylate (PMMA), and/or a material having a constant refractive index, such as polycarbonate (PC).

The light incident to one light incident side surface of the light guide plate 141 made of the above-described material has an angle not exceeding a threshold angle of the light guide plate 141. Consequently, the incident light is transmitted to an inside or inner area of the light guide plate 141. If the light is incident to an upper surface or a lower surface of the light guide plate 141, the angle of the light exceeds the threshold angle. Accordingly, the light transmitted to the inner area of the light guide plate 141 is not emitted to an outside of the light guide plate 141, but is uniformly transmitted inside the light guide plate 141.

In an exemplary embodiment, on either of upper and lower surfaces of the light guide plate 141, for example, on the lower surface thereof, a scattering pattern (not illustrated) may be formed to emit the guided light to an upper part thereof.

More than one optical sheet 142 may be disposed directly on and/or contacting the upper surface of the light guide plate 141. The optical sheet 142 serves to diffuse and/or condense the light being transmitted from the light guide plate 141. The optical sheets 142 may include a diffusion sheet, a prism sheet, a protection sheet, and the like. In one exemplary embodiment, the diffusion sheet is positioned between the light guide plate 141 and the prism sheet, and disperses the light incident from the light guide plate 141 to prevent the light from being partially concentrated. The prism sheet may includes an array of triangular prisms disposed on one surface or two opposing surfaces thereof, and serve to condense the light diffused from the diffusion sheet in a direction substantially perpendicular to the liquid crystal panel 110. The protection sheet may be disposed on the prism sheet, protect the surface of the prism sheet, and diffuse the light to make the distribution of the light uniform.

The optical sheets 142 and the light guide plate 141 are fixed by pressure by the intermediate receptacle 150. The optical sheets 142 and light guide plate 141 may be maintained contacting each other through a portion of the intermediate receptacle 150 contacting an upper portion of the optical sheets 142, and applying a force in a direction toward the lower receptacle 170, in which the light guide plate 141 and the optical sheets 142 are received. In order to prevent the position of the optical sheets 142 from being changed or to prevent the backlight assembly from undesirable moving or seceding from an original position to an outside of the liquid crystal display, such as by an external impact, the optical sheets 142 may be arranged in a zigzag manner, which will be described in detail later.

The intermediate receptacle 150 includes intermediate receptacle side walls 151a and 151b engaged with lower receptacle side walls 172a, 172b, 172c, and 172d to be described later, supports 152a and 152b bent from the intermediate receptacle side walls 151a and 151b and placed on lower receptacle upper plates 173 and 174, and fixing members 153a and 153b extending from the supports 152a and 152b and overlapping the light guide plate 141 and fixing the light guide plate 141 by pressure. Specifically, the fixing members 153a and 153b contact upper portions of both the optical sheets 142 and the light guide plate 141, and fix edges of upper surfaces of the light guide plate 141.

The intermediate receptacle 150 may be substantially in the form of a rectangular frame, and includes four intermediate receptacle side walls, two of side wall 151a and two of side wall 151b, and four intermediate supports, two of support 152a and two of support 152b. Each of the intermediate receptacle side walls 151a and 151b may be engaged with the lower receptacle side walls 172a and 172b, respectively. In one exemplary embodiment, the intermediate receptacle (e.g., container) is disposed at outer sides of the lower receptacle (e.g., container). The supports 152a and 152b are extended from the intermediate receptacle side walls 151a and 151b and substantially parallel to a plane of the light guide plate 141, toward a center part of the frame-shaped intermediate receptacle 150. A longitudinal (extension) direction of the supports 152a and 152b is substantially parallel to the horizontal direction. The supports 152a and 152b are respectively disposed on the lower receptacle upper plates 173 and 174 of the lower receptacle 170. A lower surface of the supports 152a and 152b may be disposed directly adjacent to and/or contacting an upper surface of the lower receptacle upper plates 173 and 174, as illustrated in FIG. 2.

The intermediate receptacle side walls 151a and 151b and the fixing members 153a and 153b may form a substantially "L"-shaped member. In one exemplary embodiment, at least one of the supports 152a and 152b, may be formed substantially in a "U"-shaped member (FIG. 2) so that a wire arrangement groove 156 is disposed between the support 152a or 152b and the lower receptacle upper plate 173 or 174. The wire arrangement groove 156 disposes the lower surface of the respective support 152a and 152b separated at a distance from the upper surface of the respective lower receptacle upper plates 173 and 174.

Each of the fixing members 153a and 153b are extended from the supports 152a and 152b and toward the light guide plate 141, e.g., toward the center part of the frame-shaped intermediate receptacle 150. The fixing members 153a and 153b are disposed at and form a distal end of the intermediate receptacle 150. Portions of the fixing members 153a and 153b may be formed to be thicker in a direction substantially perpendicular to the upper surface of the light guide plate 141, than portions of the supports 152a and 152b. The first and second portions of the fixing members 153a and 153b may form a "stepped" portion. In the illustrated embodiment, each of the fixing members 153a and 153b includes a first portion having a first thickness, and a second portion at the distal end having a second thickness, where the second thickness is smaller than the first thickness. A lower surface of the first portion contacts the upper surface of the light guide plate 141, while a lower surface of the second portion contacts an upper surface of the optical sheets 142, so that the fixing members 153a and 153b fix the optical sheets 142 and the light guide plate 141 in the backlight assembly, by applying pressure to the optical sheets 142 and the light guide plate 141.

An upper surface of the first and second portions of the fixing members 153a and 153b form a continuous and substantially planar upper surface of the fixing members 153a and 153b. Directly on and contacting the planar upper surfaces of the fixing members 153a and 153b, the liquid crystal panel 110 is disposed. The liquid crystal panel 110 is separated from the optical sheets 142 by the fixing members 153a and 153b of the intermediate receptacle 150. On connection parts between the intermediate receptacle side walls 151a and 151b and the supports 152a and 152b, liquid crystal panel step support portions 155a and 155b are disposed. The liquid crystal panel step support portions 155a and 155b extend from the supports 152a and 152b in a direction substantially parallel to the intermediate receptacle side walls 151a and 151b. As the liquid crystal panel 110 is disposed adjacent to an inner surface (toward a center area of the intermediate receptacle 150), secession and movement of the liquid crystal panel 110 in the horizontal or vertical direction is reduced or effectively prevented. Referring to FIG. 2 where the wire arrangement groove 156 is disposed, an inner surface (toward a center area of the intermediate receptacle 150) of the wire arrangement groove 156 serves as the liquid crystal panel step support portions 155a and 155b.

The intermediate receptacle 150 may further include a plurality of spacers 154a and 154b, also referred to as a spacer, for reducing a gap between the optical sheets 142 and the lower receptacle 170, which will be described in detail later. The spacers 154a and 154b may be considered as the first portion of the fixing members 153a and 153b having the first thickness larger than the second thickness of the second portion. The spacers 154a and 154b, the fixing members 153a and 153b, the supports 152a and 152b and the intermediate receptacle side walls 151a and 151b collectively form the intermediate receptacle 150 as a single, continuous and unitary body.

In an exemplary embodiment, the intermediate receptacle 150, may be a plastic mold frame, to reduce or effectively prevent the damage of components fixed by the intermediate receptacle 150.

In an exemplary embodiment, the reflection sheet 160, may be made of PET (polyethyleneterephthalate) and have a flexibility. A surface of one side or both sides of the reflection sheet 160 may be coated with a diffusion layer, such as including titanium dioxide.

The reflection sheet 160 is disposed surrounding and directly adjacent to the lower surface of the light guide plate 141 and the first and second light sources 131a and 131b. The reflection sheet 160 may be a single, continuous and indivisible unit while being disposed directly adjacent to the lower surface of the light guide plate 141 and the first and second light sources 131a and 131b. The reflection sheet 160 reflects the light initially emitted toward the lower part of the light guide plate 141 and the side surface of the lower receptacle 170, to an upper part of the light guide plate, to ultimately be emitted out of the light guide plate 141. In an exemplary embodiment, light transmitted in the light guide plate, but not reflected by the reflection sheet 160 may be reflected to a light-emitting surface of the light guide plate 141 by a fine dot pattern (not shown) disposed on a rear surface of the light guide plate 141 facing the reflection sheet 160, and a loss of light can be advantageously reduced.

In one exemplary embodiment, the reflection sheet 160 may be attached to the lower receptacle 170 using an attaching member, such as an adhesive or double-faced tape. The reflection sheet 160 may overlap (e.g., cover) an entire of an inner surface of a bottom plate 171 of the lower receptacle 170, an entire of an inner surface of the lower receptacle side walls 172a and 172b, and an entire of an inner surface of the lower receptacle upper plates 173 and 174. Alternatively, the reflection sheet may overlap only a portion of the inner surface of the lower receptacle upper plates 173 and 174, as illustrated in FIG. 2.

The reflection sheet 160 may include a bottom sheet portion 161 disposed between the bottom plate 171 of the lower receptacle 170 and the light guide plate 141, and directly adjacent to and contacting the bottom plate 171 of the lower receptacle 170 and the lower part (e.g., the lower surface) of the light guide plate 141. The reflection sheet 160 may further include lamp cover sheet portions 162a, 162b, 163a, and 163b reflecting light emitted from the first and second light sources 131a and 132a disposed on both sides of the light guide plate 141. In one embodiment of the present invention, the bottom sheet 161 and the lamp cover sheets 162a, 162b, 163a, and 163b of the reflection sheet 160 are formed in a single, continuous and indivisible body, facilitating the assembly of the reflection sheet 160 on the lower receptacle 170. As shown by dotted lines in FIG. 1, the single body may be shaped (e.g., bent) at the dotted lines to form the "U"-shaped member collectively including the bottom sheet 161 and the lamp cover sheets 162a, 162b, 163a, and 163b disposed adjacent to the first and second light sources 131a and 132a.

In a modified exemplary embodiment of the present invention, the reflection sheet 160 may be laminated on the bottom plate 171 of the lower receptacle 170, the lower receptacle side walls 172a and 172b, and the lower receptacle upper plates 173 and 174. The bottom sheet 161 and the lamp cover sheets 162a, 162b, 163a, and 163b may be formed as separate and individual members (e.g., not continuous with each other).

Referring to FIGS. 1 and 2, an upper receptacle 180 is disposed on the upper part of the liquid crystal panel 110 (e.g., at the viewing side of the liquid crystal display) to overlap and cover edges of the upper surface of the liquid crystal panel 110 received in the lower receptacle 170. The upper receptacle 180 may be coupled with the lower receptacle 170, such that the upper receptacle 180 is disposed as an outermost member of the liquid crystal display. The upper receptacle 180 may also be referred to as outwardly combined with the intermediate receptacle 150 and the lower receptacle 170. An upper surface of the upper receptacle 180 includes a window exposing the liquid crystal panel 110 to an outside of the liquid crystal display, or the viewing side. The upper surface of the upper receptacle may include a stepped portion at the viewing side.

In one exemplary embodiment, the upper receptacle 180 may be coupled with the lower receptacle 170 through a hook engagement (not illustrated) and/or a screw engagement (not illustrated). The upper receptacle 180 and the lower receptacle 170 can be engaged with each other in diverse forms, so long as the upper receptacle 180 and the lower receptacle 170 are securely fixed to each other. In exemplary embodiments, the coupled upper receptacle 180 and the lower receptacle 170 may be removably engaged with each other.

Figure 3:
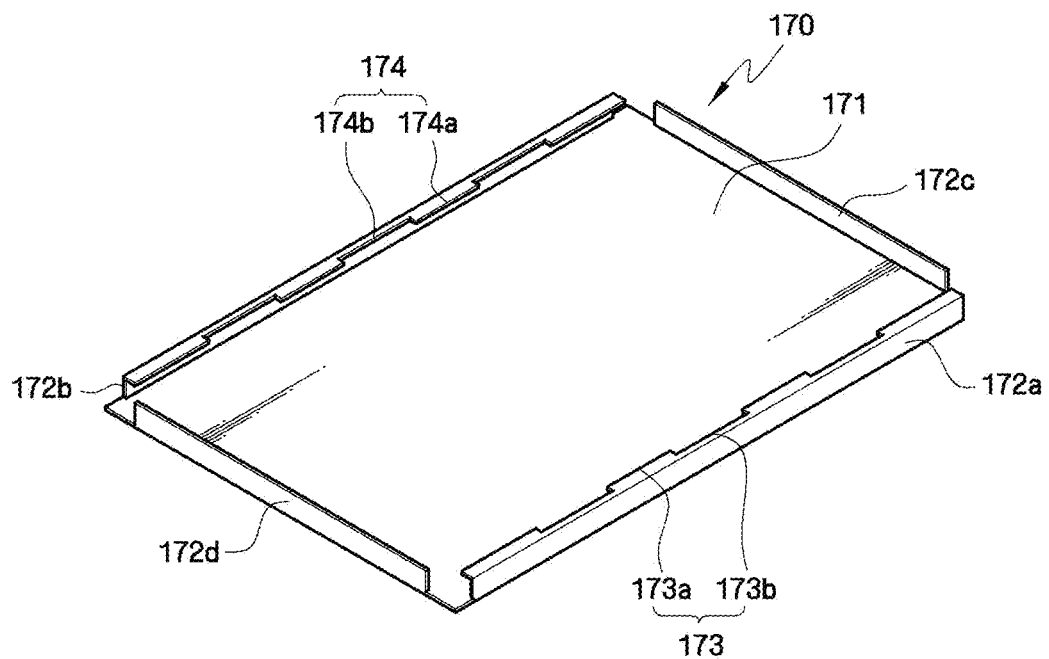
FIG. 3 is a perspective view of an exemplary embodiment of a lower receptacle included in a liquid crystal display, according to the present invention.
Figure 4:
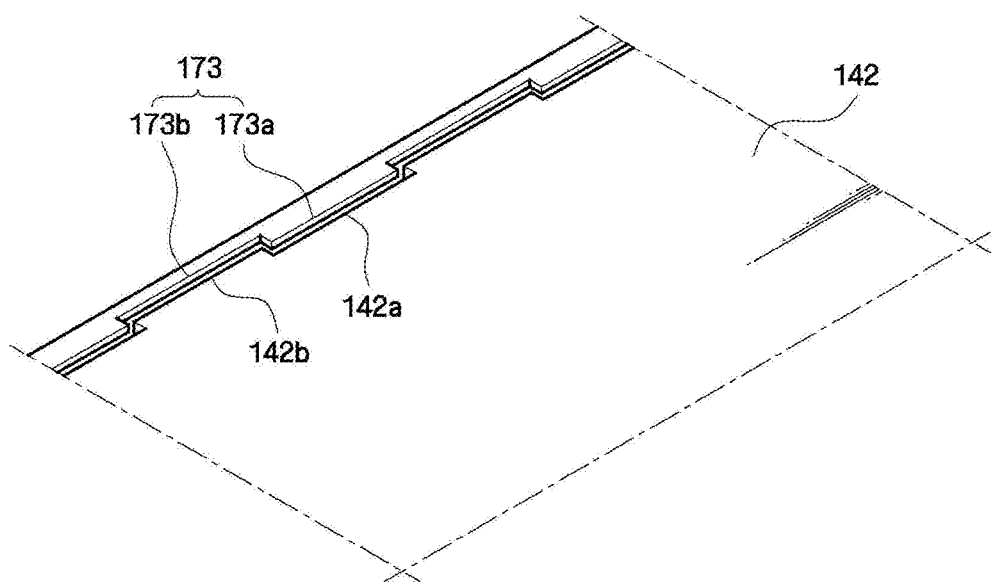
FIG. 4 is a schematic view illustrating an exemplary embodiment of shapes of a lower receptacle and an optical sheet included in a liquid crystal display, according to the present invention.
Figure 5:
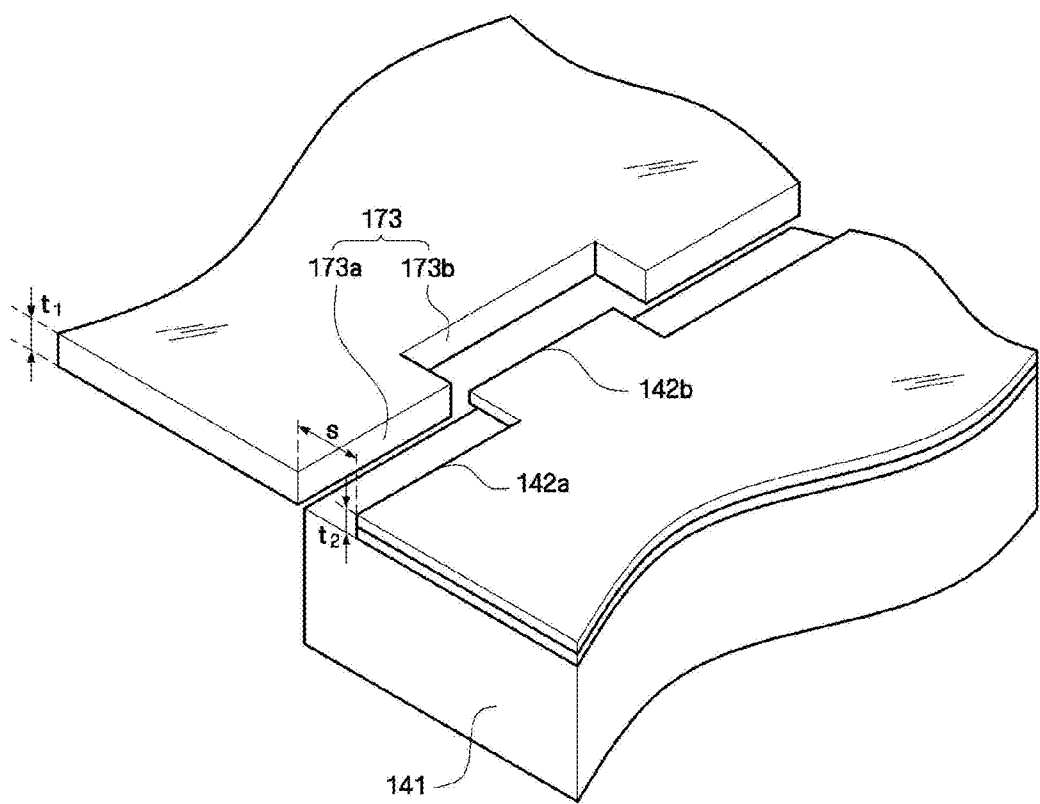
FIG. 5 is a schematic view illustrating an exemplary embodiment of shapes of a lower receptacle, an optical sheet, and a light guide plate included in a liquid crystal display, according to the present invention.
Figure 6:
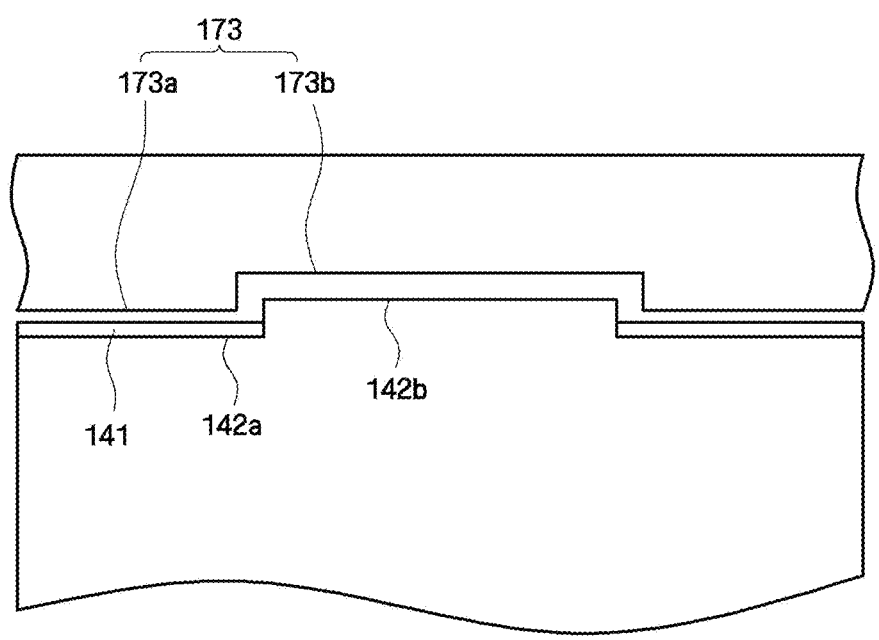
FIG. 6 is a plan view illustrating an exemplary embodiment of shapes of a lower receptacle and an optical sheet included in a liquid crystal display, according to the present invention.
Figure 7:
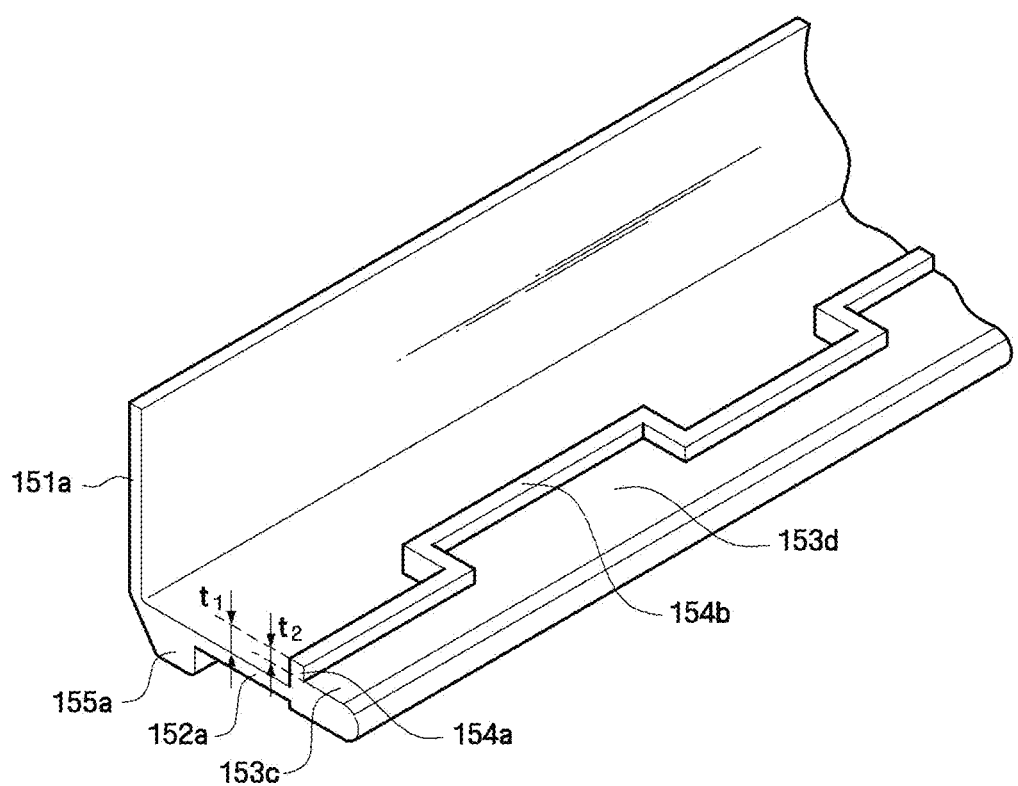
FIG. 7 is a bottom perspective view illustrating an exemplary embodiment of a portion of an intermediate receptacle of a liquid crystal display, according to the present invention.

Hereinafter, with reference to FIGS. 2 to 7, shapes of some members of the and the positional relations between them will be described. FIG. 3 is a perspective view of an exemplary embodiment of a lower receptacle included in a liquid crystal display according to the present invention, FIG. 4 is a schematic view illustrating an exemplary embodiment of shapes of a lower receptacle and an optical sheet included in a liquid crystal display according to the present invention, and FIG. 5 is a schematic view illustrating an exemplary embodiment of shapes of a lower receptacle, an optical sheet, and a light guide plate included in a liquid crystal display according to the present invention. FIG. 6 is a plan view illustrating an exemplary embodiment of shapes of a lower receptacle and an optical sheet included in a liquid crystal display according to the present invention, and FIG. 7 is a bottom perspective view illustrating an exemplary embodiment of a portion of an intermediate receptacle of a liquid crystal display according to the present invention.

Referring to FIGS. 2 and 3, an exemplary embodiment of the lower receptacle 170 may include a metallic material, to secure the intensity and ground capability against an external impact.

The lower receptacle 170 includes the bottom plate 171 on which the light guide plate 141 and the first and second light sources 131a and 132a are disposed, the lower receptacle side walls 172a and 172b extending in a direction substantially perpendicular to the bottom plate 171 to surround all edges of the bottom plate 171, and the lower receptacle upper plates 173 and 174 extended from an upper end of the lower receptacle side walls 172a and 172b to surround the first and second light sources 131a and 132a. The lower receptacle upper plates 173 and 174 may be extended substantially parallel with the light guide plate 141, but without overlapping the light guide plate 141, as shown in FIG. 2.

In one exemplary embodiment of the present invention, the bottom plate 171, the lower receptacle side walls 172a and 172b, and the lower receptacle upper plates 173 and 174 of the lower receptacle 170 collectively form the lower receptacle 170 as a single, continuous and unitary body. At boundaries between the bottom plate 171, the lower receptacle side walls 172a and 172b, and the lower receptacle upper plates 173 and 174, the lower receptacle 170 may be bent to form a substantially "U"-shaped member, which overlaps and covers the first and second light sources 131a and 132b. At boundaries between the bottom plate 171, and the lower receptacle side walls 172c and 172d, and the, the lower receptacle 170 may be bent to form a substantially "L"-shaped member.

As illustrated in FIG. 2, the light guide plate 141 has a width taken in the vertical direction, that is smaller than a length of a distance between distal end of the lower receptacle upper plates 173 and 174, such that the light guide plate 141 can be disposed in the lower receptacle without overlapping the lower receptacle upper plates 173 and 174. The light guide plate 141 is not disposed under the lower surface of the lower receptacle upper plates 173 and 174. Advantageously, it is relative easy to arrange the light guide plate 141 in the lower receptacle 170, and even if an error occurs in forming the width of the light guide plate 141, there is little to no effect on assembling the backlight assembly and in managing of dimensions. Also, since the lower receptacle 170 is a single, continuous and unitary body, it is further advantageously not required to manufacture the lower receptacle 170 as separate members, and the manufacturing and assembling of the liquid crystal display is simplified.

Referring again to FIG. 2, the optical sheets 142 do not overlap the upper surface or the lower surface of the lower receptacle upper plates 173 and 174. The optical sheets 142 are in the form of substantially flat plates, which are placed between the distal ends of the lower receptacle upper plate 173 and the lower receptacle upper plate 174 in the vertical direction, and spaced apart from the plates 173 and 174, such as in a plan view of the liquid crystal display. In an alternative embodiment where the optical sheets 142 overlap the upper and/or lower surfaces of the lower receptacle upper plates 173 and 174, a space provided in the lower surface of the optical sheet 142 is removed to reduce the occurrence of foreign substances.

Referring to FIG. 3, in the lower receptacle upper plates 173 and 174, lower receptacle upper plate projecting parts 173a and 174a and lower receptacle upper plate recessed parts 173b and 174b are alternately disposed in zigzag arrangement, along the horizontal direction (FIG. 1). The zigzag arrangement reduces or effectively prevents the optical sheet 142 from seceding from the backlight assembly due to an external impact. A distal end of the lower receptacle upper plate projecting parts 173a and 174a is coplanar with an innermost edge of the lower receptacle upper plates 173 and 174. A distal end of the lower receptacle upper plate recessed parts 173b and 174b is spaced away from the innermost edge of the lower receptacle upper plates 173 and 174, and from the distal end of the lower receptacle upper plate projecting parts 173a and 174a.

Referring to FIG. 4, in the optical sheets 142, optical sheet projecting parts 142b and optical sheet recessed parts 142a are alternately disposed in the horizontal direction (FIG. 1). The optical sheet projecting parts 142b are disposed in positions corresponding to the lower receptacle upper plate recessed parts 173b and 174b, and conversely, the optical sheet recessed parts 142a are disposed in positions corresponding to the lower receptacle upper plate projecting parts 173a and 174a. In exemplary embodiments, the lower surface of the optical sheets 142 or the upper surface of the light guide plate 141, may be disposed substantially coplanarly with the lower surface of the lower receptacle upper plates 173 and 174. A portion of or a whole of outer faces of the optical sheets 142 may be overlapped by an inner face of the distal ends of the lower receptacle upper plates 173 and 174, so as to reduce or effectively prevent the optical sheets 142 from seceding from the backlight assembly due to an external impact.

Since a profile of the optical sheet projecting parts 142b and the optical sheet recessed parts 142a respectively complement a profile of the lower receptacle upper plate recessed parts 173b and the lower receptacle upper plate projecting parts 173a in zigzag form, the movement and seceding of the optical sheets 142 from the backlight assembly can be reduced or effectively prevented. Also, since the optical sheets 142 are in the form of a flat plate, the sheets are prevented from being wrinkled.

Referring to FIGS. 5 and 6, the lower surface of the optical sheets 142 is disposed facing the upper surface of the light guide plate 141. In a plan view, at least a portion of edges of the upper surface of the light guide plate 141 is exposed to an outside of outer edges (e.g., ends) of the optical sheets 142. The outer edges of the optical sheets 142 are disposed apart from the distal ends of the lower receptacle upper plates 173 and 174, by a distance "s". Advantageously, even if the optical sheets 142 are thermally expanded, the optical sheets 142 do not contact the lower receptacle upper plates 173 and 174, and may not wrinkled or deformed.

In the illustrated embodiment, since a total thickness $t_1$ of each of the lower receptacle upper plates 173 and 174 is larger than a total thickness $t_2$ of the optical sheets 142, the intermediate receptacle 150, which overlaps the lower receptacle upper plates 173 and 174 and the optical sheets 142, has stepped portions to accommodate the difference in thicknesses of the lower receptacle upper plates 173 and 174 and the optical sheets 142.

Referring to FIGS. 5 and 7, the intermediate receptacle 150 has stepped portion $(t_1-t_2)$ that is a difference between the thickness $t_1$ of the lower receptacle upper plates 173 and 174 and the thickness $t_2$ of the optical sheets 142. The space removal part 154a and 154b are arranged on a lower face of the fixing members 153a and 153b. The intermediate receptacle 150 includes intermediate receptacle recessed parts 153c and intermediate receptacle projecting parts 153d corresponding to the zigzag shape of the lower receptacle upper plates 173 and 174.

In order to prevent the inflow of foreign substances to the space between the lower receptacle upper plates 173 and 174 and the optical sheets 142, the space removal part 154a and 154b is disposed to project from the lower parts of the fixing members 153a and 153b of the lower receptacle 170. The space removal part 154a and 154b may be disposed along the space between the lower receptacle upper plates 173 and 174 and the optical sheets 142, such as to respectively correspond to the intermediate receptacle recessed parts 153c and intermediate receptacle projecting parts 153d.

Hereinafter, with reference to FIGS. 8 and 9, another exemplary embodiment of a liquid crystal display according to present invention will be described.

Figure 8:
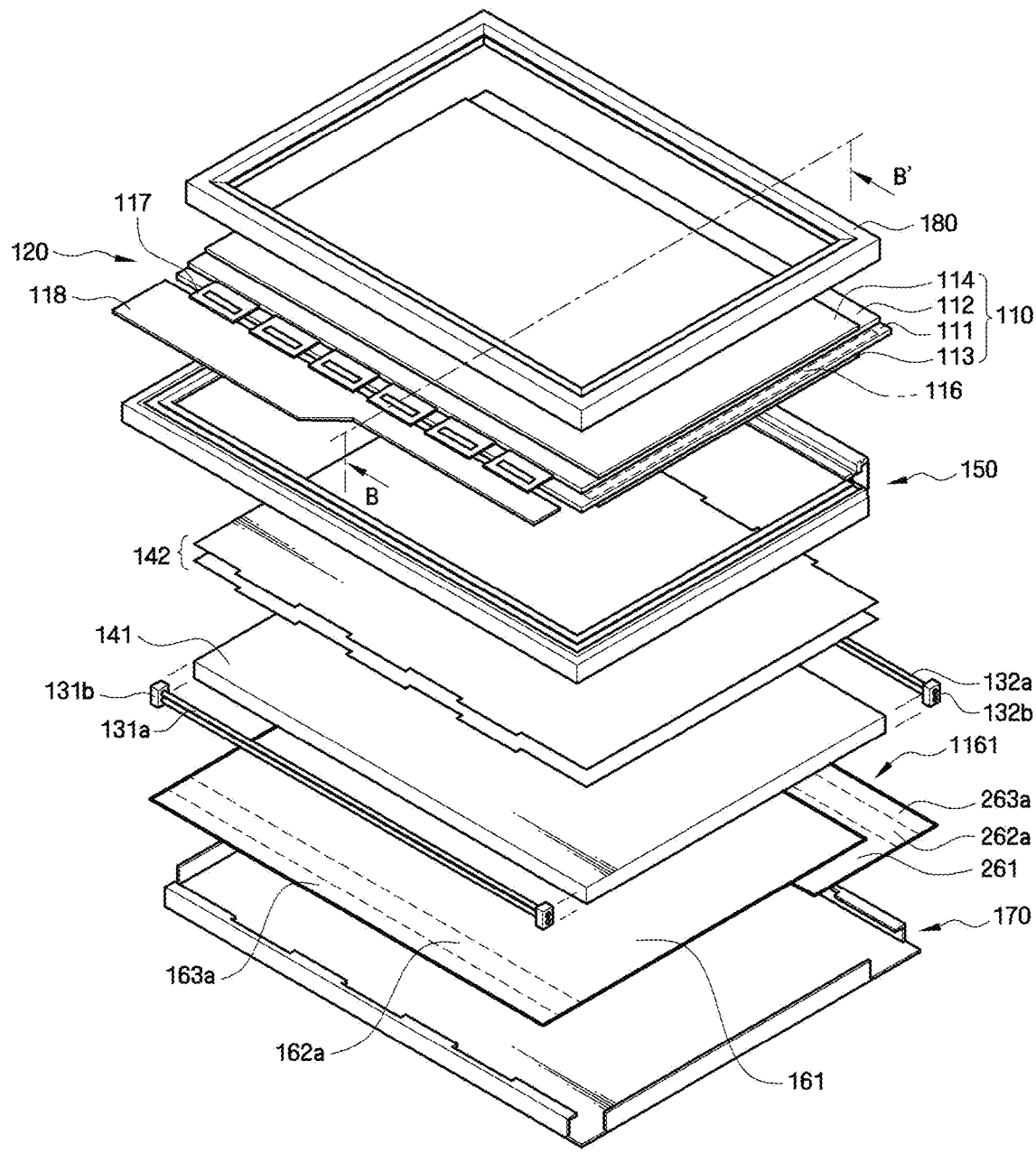
FIG. 8 is an exploded perspective view of another exemplary embodiment of a liquid crystal display according to the present invention.
Figure 9:
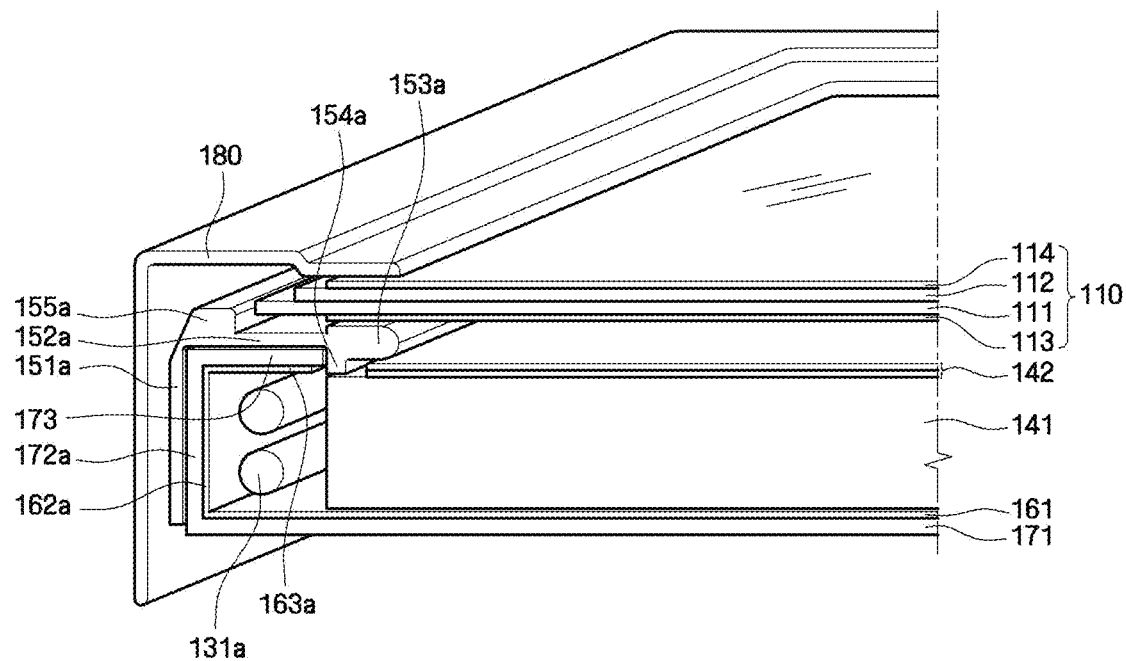
FIG. 9 is a cross-sectional view of the liquid crystal display, taken along line B-B' of FIG. 8.
Figure 9:
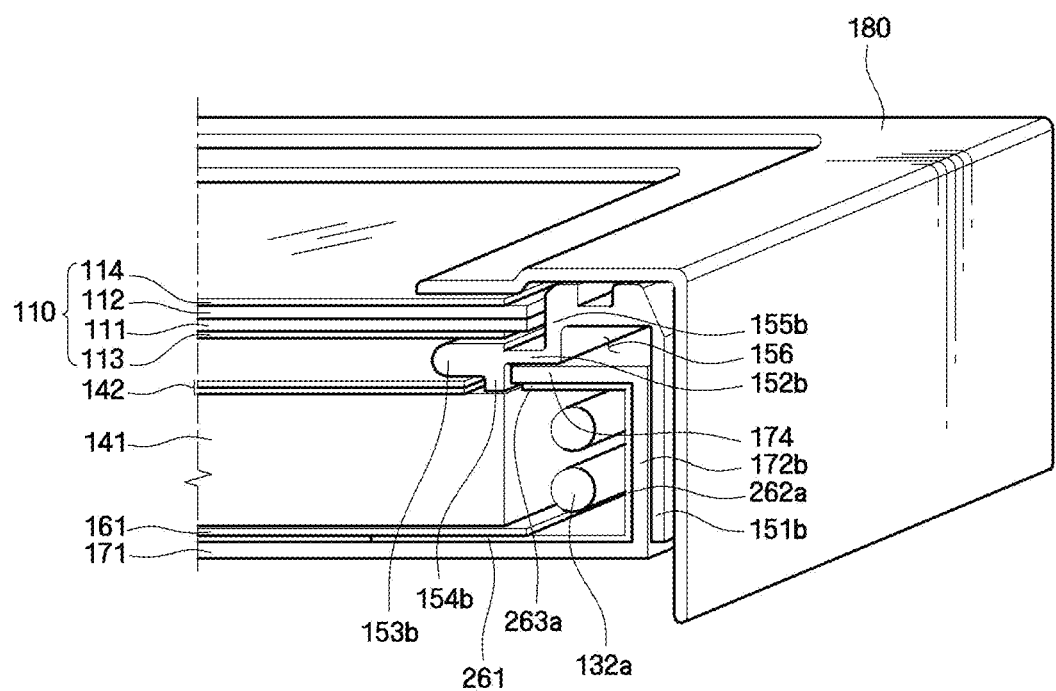

FIG. 8 is an exploded perspective view of another exemplary embodiment of a liquid crystal display according to the present invention, and FIG. 9 is a cross-sectional view of the liquid crystal display, taken along line B-B' of FIG. 8. In the following illustrated embodiments of the present invention, the same drawing reference numerals are used for the same elements across various figures, and for convenience in explanation, the detailed description of the corresponding elements will be omitted or simplified.

Referring to FIGS. 8 and 9, the first and second light sources 131a and 132a are disposed on both sides of the light guide plate 141.

In the illustrated embodiment of the present invention, the reflection sheets 1161 are divided into two parts. The reflection sheets 1161 include first reflection sheet collectively including 161, 162a and 163a, and overlapping the lower surface of the light guide plate 141 and the first light source 131a disposed on one side of the light guide plate 141, and second reflection sheet collectively including 261, 262a, and 263a covering the second light source 132a disposed on the other side of the light guide plate.

The first reflection sheet 161, 162a, and 163a includes lamp cover sheets 162a and 163a extending from edges of a bottom sheet 161 and bent to form a substantially "U"-shaped member, to surround the lower surface of the light guide plate 141 and the first light source 131a. The bottom sheet 161 and lamp cover sheets 162a and 163a may be continuously formed such that the first reflection sheet is a single and unitary body, or the bottom sheet 161 and lamp cover sheets 162a and 163a may be separately and individually formed.

The second reflection sheet 261, 262a, and 263a includes lamp cover sheets 262a and 263a extending from edges of a bottom sheet 261 and are bent to form a substantially "U"-shaped member, to surround a portion of the bottom sheet 161 of the first reflection sheets 161, 162a, and 163a, and the second light source 132a. The bottom sheet 261 and lamp cover sheets 262a and 263a may be continuously formed such that the second reflection sheet is a single and unitary body, or the bottom sheet 261 and lamp cover sheets 262a and 263a may be separately and individually formed. The bottom sheet 261 has a width in a transverse direction of the liquid crystal display smaller than a width of the bottom sheet 161. The transverse direction is substantially perpendicular to a longitudinal direction of the liquid crystal display, in a plan view.

The (first) bottom sheet 161 may overlap a whole of the lower surface of the light guide plate 141, or may overlap at least a whole of the transverse length of the light guide plate 141, as shown in FIGS. 8 and 9. The (second) bottom sheet 261 is disposed to overlap only a portion of the lower surface or the transverse length, of the light guide plate 141. Portions of both the first bottom sheet 161 and the second bottom sheet 261 are disposed between the light guide plate 141 and the lower receptacle 170, the portions being adjacent to one light incident surface of the light guide plate 141 corresponding to the second light source 132a.

The bottom sheet 261 of the second reflection sheets 261, 262a, and 263a overlaps the bottom sheet 161 of the first reflection sheets 161, 162a, and 163a in order to prevent a light leak phenomenon due to a mismatch between the first reflection sheets 161, 162a, and 163a and the second reflection sheets 261, 262a, and 263a. An entire of the bottom sheet 261 may overlap a portion of the bottom sheet 161.

By using the reflection sheet 1161, including a first reflection sheet 161, 162a, and 163a and the second reflecting sheet 261, 262a, and 263a, according to the illustrated embodiment of the present invention, wrinkling or deforming of the reflection sheet 1161 around the second light source 132a can be advantageously reduced or effectively prevented.

Hereinafter, with reference to FIGS. 10 and 11, another exemplary embodiment of a liquid crystal display according to the present invention will be described in detail.

Figure 10:
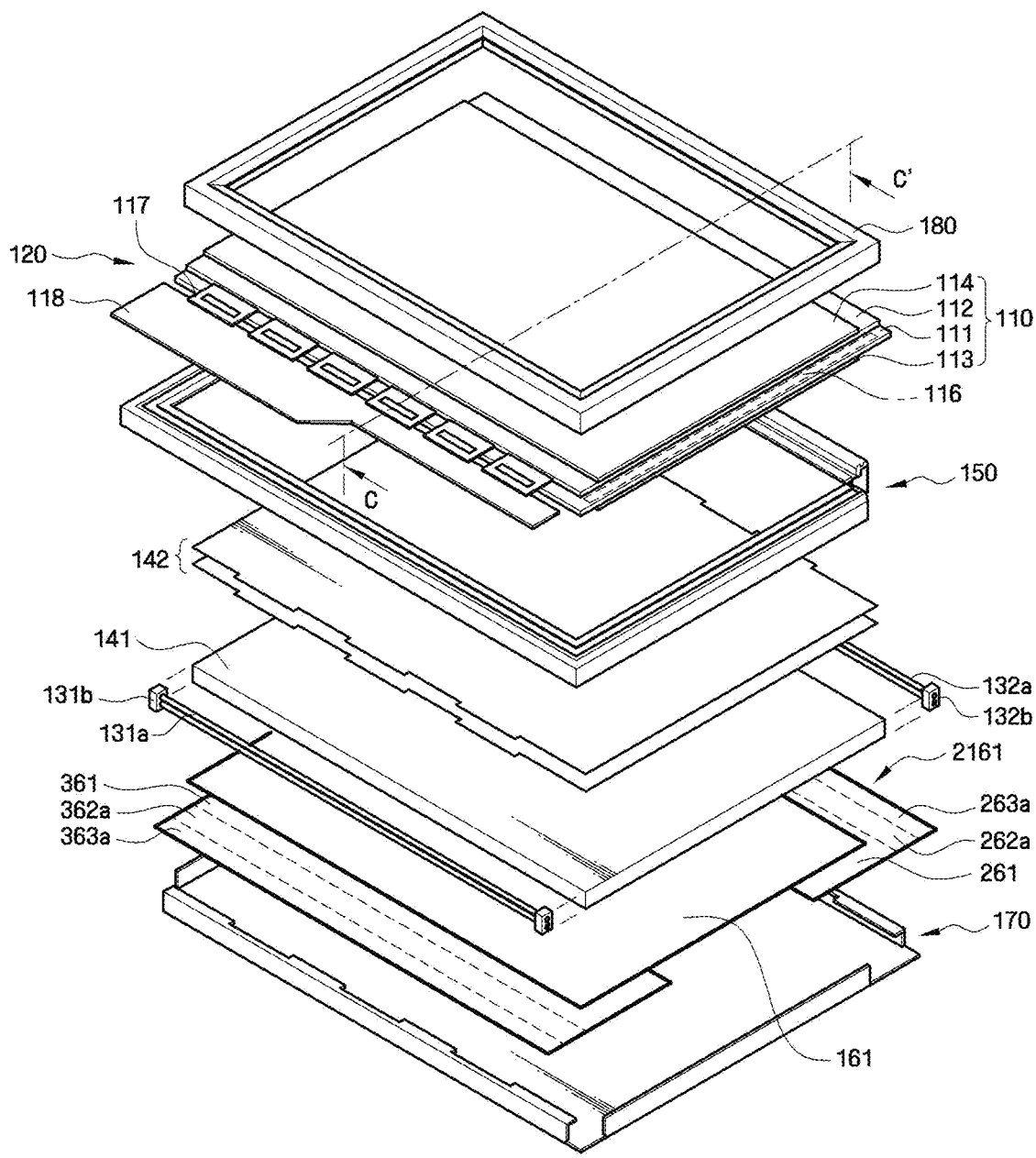
FIG. 10 is an exploded perspective view of another exemplary embodiment of a liquid crystal display according to the present invention.
Figure 11:
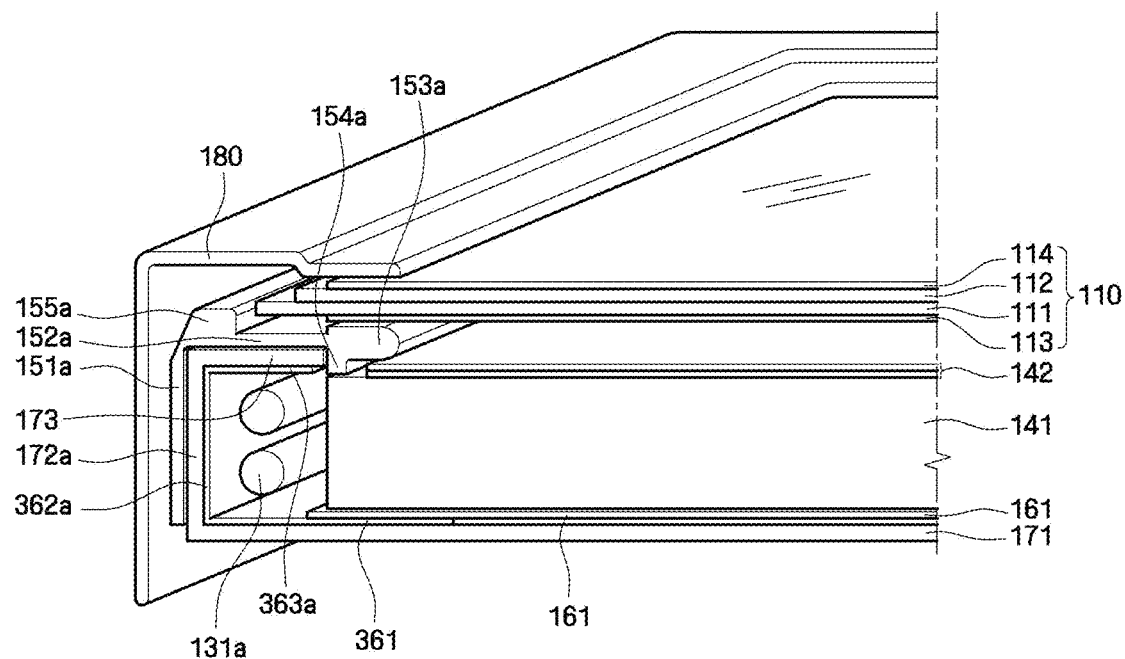
FIG. 11 is a cross-sectional view of the liquid crystal display, taken along line C-C' of FIG. 10.
Figure 11:
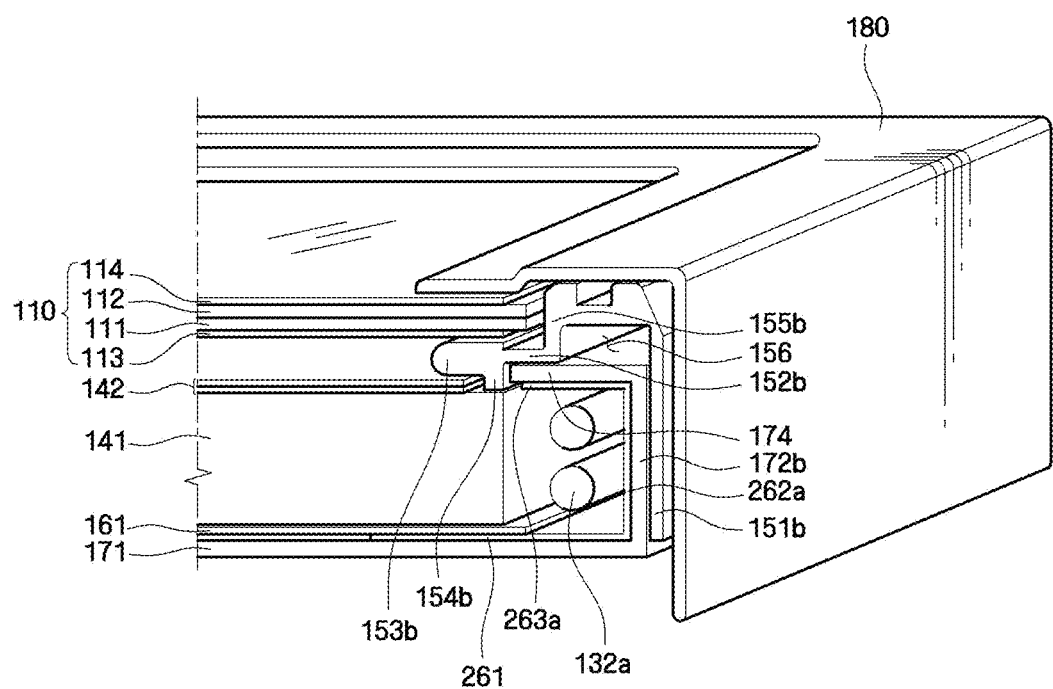

FIG. 10 is an exploded perspective view of another exemplary embodiment a liquid crystal display according to the present invention, and FIG. 11 is a cross-sectional view of a liquid crystal display, taken along line C-C' of FIG. 10.

Referring to FIGS. 10 and 11, the reflection sheet 2161 according to the embodiment of the present invention includes the first reflection sheet 161 disposed in the lower part of the light guide plate 141, and second and third reflection sheets 261, 262a, 263a, 361, 362a, and 363a overlapping and covering the first and second light sources 131a and 132a disposed on both sides of the light guide plate 141.

The first reflection sheet 161 is a bottom sheet disposed substantially in the form of a flat plate, and is disposed directly adjacent to the lower surface of the light guide plate 141. The (first) bottom sheet 161 may overlap a whole of the lower surface of the light guide plate 141, or may overlap at least a whole of the transverse length of the light guide plate 141, as shown in FIGS. 10 and 11.

The second reflection sheets 261, 262a, and 263a include lamp cover sheets 262a and 263a extending from edges of a bottom sheet 261 and are bent to form a substantially "U" shaped member. The bottom sheet 261 overlaps a portion of the bottom sheet 161, and is disposed to overlap a portion of the lower surface of the light guide plate 141 at one side adjacent to the second light source 132a.

The third reflection sheets 361, 362a, and 363a include lamp cover sheets 362a and 363a extending from edges of a bottom sheet 361 and are bent to form a substantially "U" shaped member. The bottom sheet 361 overlaps a portion the bottom sheet 161, and is disposed to overlap a portion of the lower surface of the light guide plate 141 at one side adjacent to the first light source 131a. The bottom sheet 361 and lamp cover sheets 362a and 363a may be continuously formed such that the third reflection sheet is a single and unitary body, or the bottom sheet 361 and lamp cover sheets 362a and 363a may be separately and individually formed. The bottom sheet 361 has a width in a transverse direction of the liquid crystal display smaller than a width of the bottom sheet 161. The transverse direction is substantially perpendicular to a longitudinal direction of the liquid crystal display, in a plan view.

The (second) bottom sheet 261 and the (third) bottom sheet 361 are disposed to overlap only a portion of the lower surface or the transverse length, of the light guide plate 141. A central area of the lower surface of the light guide plate 141 is not covered by the second and third bottom portions 261 and 361. Portions of both the first bottom sheet 161 and the second bottom sheet 261 are disposed between the light guide plate 141 and the lower receptacle 170, the portions being adjacent to one light incident surface of the light guide plate 141 corresponding to the second light source 132a. Similarly, portions of both the first bottom sheet 161 and the third bottom sheet 361 are also disposed between the light guide plate 141 and the lower receptacle 170, the portions being adjacent to one light incident surface of the light guide plate 141 corresponding to the first light source 131a.

By using the reflection sheet 2161 according to the illustrated embodiment of the present invention, wrinkling or deforming of the reflection sheets 261, 262a, 263a, 361, 362a, and 363a around the first and second light sources 131a and 132a can be reduced or effectively prevented.

Figure 12:
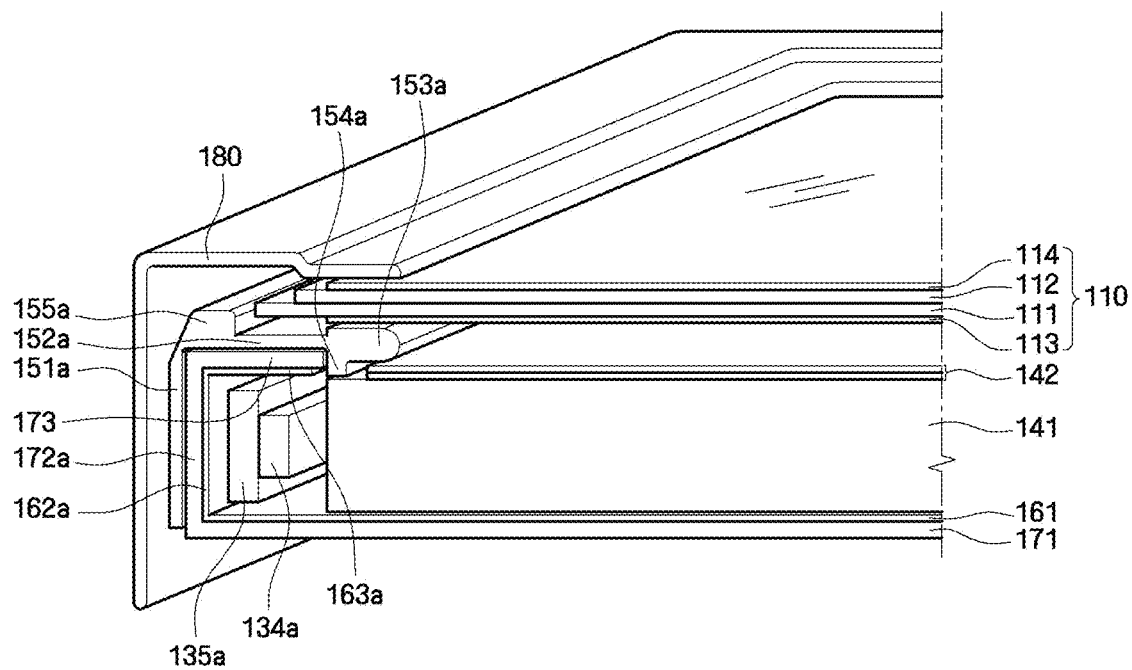
FIG. 12 is a cross-sectional view of another embodiment of a liquid crystal display, taken along the same line A-A' in FIG. 2, according to the present invention.
Figure 12:
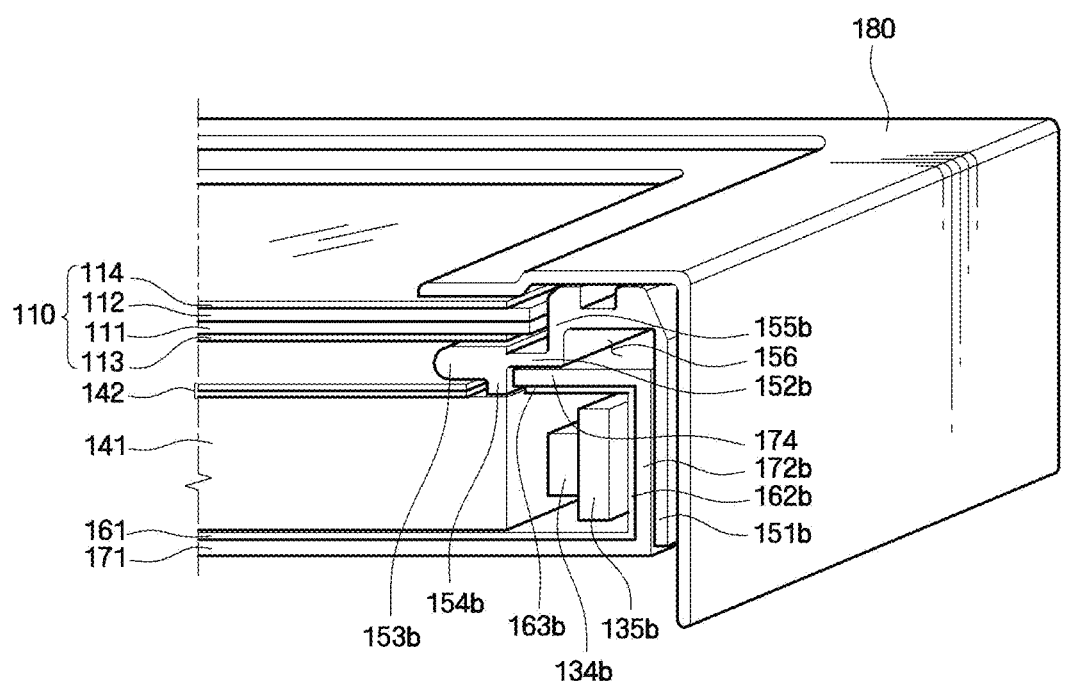

Hereinafter, with reference to FIG. 12, another exemplary embodiment of a liquid crystal display according to the present invention will be described in detail. FIG. 12 is a cross-sectional view of another exemplary embodiment of a liquid crystal display, taken along the same line A-A' as in FIG. 2, according to the present invention.

Referring to FIG. 12, first and second light sources 134a and 134b may be point light sources. The first and second light sources 134a and 134b are disposed on both of light incident sides of the light guide plate 141. Each of the first and second light sources 134a and 134b may include a plurality of LEDs disposed at intervals on alignment plates 135a and 135b, respectively. The plurality of LEDs may be arranged on the alignment plates 135a and 135b along a horizontal direction of the lower receptacle 170, or the longitudinal direction of the liquid crystal display.

In an alternative exemplary embodiment of the present invention, a plurality of the LEDs may be directly disposed on regions of the lamp cover sheets 162a, 163a, 162b, and 163b, and in this case, it is required that the lamp cover sheets 162a, 163a, 162b, and 163b have a sufficient thicknesses enough to support the LEDs. Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A liquid crystal display comprising:
a light guide plate guiding light;
a first light source adjacent to a first side of the light guide plate;
a lower receptacle including:
   a bottom plate on which the light guide plate and first the light source are disposed,
   a lower receptacle side wall extending in a direction substantially perpendicular to the bottom plate, and from an edge of the bottom plate, and
   an upper plate extended from the lower receptable side wall and substantially parallel to the bottom plate,
a reflection sheet between the upper plate of the lower receptacle and the first light source;
an optical sheet on the light guide plate, and spaced apart from an outer edge of the upper plate of the lower receptacle and an outer edge of the reflection sheet; and
an intermediate receptacle comprising a spacer between the optical sheet, and the outer edges of the lower receptacle upper plate and the reflection sheet, respectively;
wherein an entire portion of the upper plate does not overlap the light guide plate, in a plan view of the liquid crystal display.

2. The liquid crystal display of claim 1, wherein the intermediate receptacle further comprises:
- intermediate receptacle side walls engaged with the lower receptacle side wall;
- a support extended from the intermediate receptacle side walls, and disposed facing the lower receptacle upper plate; and
- a fixing member extending from the support and overlapping the light guide plate.

3. The liquid crystal display of claim 2, wherein the support includes a stepped portion defining a wire arrangement groove disposed between the support and the lower receptacle upper plate.

4. The liquid crystal display of claim 1, wherein the optical sheet comprises optical sheet projecting parts, and optical sheet recessed parts alternated with the optical sheet projecting parts in a first direction of the liquid crystal display,
- wherein the lower receptacle upper plate comprises lower receptacle upper plate projecting parts, and lower receptacle upper plate recessed parts which are alternately disposed with the lower receptacle upper plate projecting parts, in a zigzag arrangement in the first direction; and
- wherein the optical sheet projecting parts and the optical sheet recessed parts are disposed in positions corresponding to the lower receptacle upper plate recessed parts and the lower receptacle upper plate projecting parts, respectively.

5. The liquid crystal display of claim 1, wherein the intermediate receptacle further comprises:
- intermediate receptacle side walls engaged with the lower receptacle side wall;
- supports extended from the intermediate receptacle side walls, and disposed facing the lower receptacle upper plate;
- fixing members extending from the supports, overlapping the light guide plate, in the plan view, and contacting edges of the optical sheet; and
- the spacer projecting from the fixing members, and toward the bottom plate and in the direction substantially perpendicular to the bottom plate.

6. The liquid crystal display of claim 1, wherein the reflection sheet overlaps the bottom plate, the lower receptacle side walls and the lower receptacle upper plate of the lower receptacle.

7. The liquid crystal display of claim 6, wherein the reflection sheet is laminated on the bottom plate, the lower receptacle side walls, and surfaces of the lower receptacle upper plate.

8. The liquid crystal display of claim 6, further comprising a second light source disposed on a second side of the light guide plate opposing the first side, and
- wherein the reflection sheet comprises:
  - a bottom sheet disposed facing a lower surface of the light guide plate, and
  - lamp cover sheets reflecting light emitted from the first light source and the second light sources,
- wherein the bottom sheet and lamp cover sheets form a continuous unitary body.

9. The liquid crystal display of claim 6, further comprising a second light source disposed at a second side of the light guide plate opposing the first side, and
- the reflection sheet comprises:
  - a first bottom sheet disposed directly adjacent to and facing a lower surface of the light guide plate,
  - a first lamp cover sheet extended from the first bottom sheet, facing the first light source, and reflecting light emitted from the first light source towards the light guide plate,
  - a second bottom sheet disposed directly adjacent to the first bottom sheet and facing the lower surface of the light guide plate, and
  - a second lamp cover sheet extended from the second bottom sheet, facing the second light source, and reflecting light emitted from the second light source towards the light guide plate,
- wherein the second bottom sheet overlaps a portion of the first bottom sheet at the second side of the light guide plate.

10. The liquid crystal display of claim 6, further comprising a second light source disposed at a second side of the light guide plate opposing the first side, and
- the reflection sheet comprises:
  - a substantially planar first bottom sheet disposed directly adjacent to and facing a lower surface of the light guide plate,
  - a second bottom sheet disposed directly adjacent to the first bottom sheet and facing the lower surface of the light guide plate,
  - a first lamp cover sheet extended from the second bottom sheet, facing the first light source, and reflecting light emitted from the first light source towards the light guide plate,
  - a third bottom sheet disposed directly adjacent to the first bottom sheet and facing the lower surface of the light guide plate,
  - a second lamp cover sheet extended from the third bottom sheet, facing the second light source, and reflecting light emitted from the second light source towards the light guide plate,
- wherein the second bottom sheet overlaps a first portion of the first bottom sheet at the first side of the light guide plate, and the third reflection sheet overlaps a second portion of the first bottom sheet at the second side of the light guide plate, the first and second portions of the light guide plate being spaced apart from each other, in a plan view of the liquid crystal display.

* * * * *